US009226184B2

(12) United States Patent
Silverman et al.

(10) Patent No.: US 9,226,184 B2
(45) Date of Patent: Dec. 29, 2015

(54) ESTIMATING AND UTILIZING CLIENT RECEIVE INTERFERENCE CANCELLATION CAPABILITY IN MULTI-USER TRANSMISSIONS

(71) Applicant: Cisco Technology, Inc., San Jose, CA (US)

(72) Inventors: Matthew A. Silverman, Shaker Heights, OH (US); Paul J. Stager, Akron, OH (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 13/928,452

(22) Filed: Jun. 27, 2013

(65) Prior Publication Data

US 2015/0003261 A1 Jan. 1, 2015

(51) Int. Cl.
| | |
|---|---|
| H04W 24/08 | (2009.01) |
| H04B 7/04 | (2006.01) |
| H04L 1/24 | (2006.01) |
| H04W 24/06 | (2009.01) |
| H04L 25/03 | (2006.01) |

(52) U.S. Cl.
CPC .............. *H04W 24/08* (2013.01); *H04B 7/0452* (2013.01); *H04B 7/0456* (2013.01); *H04L 1/24* (2013.01); *H04L 2025/03426* (2013.01); *H04W 24/06* (2013.01)

(58) Field of Classification Search
None
See application file for complete search history.

(56) References Cited

U.S. PATENT DOCUMENTS

| | | | |
|---|---|---|---|
| 7,117,018 B2 | 10/2006 | Lewis | |
| 7,424,268 B2 | 9/2008 | Diener et al. | |
| 7,680,457 B2 | 3/2010 | Jin et al. | |
| 8,059,744 B2 | 11/2011 | Jin et al. | |
| 8,134,503 B2 | 3/2012 | Na et al. | |
| 8,254,845 B2 | 8/2012 | Na et al. | |
| 8,295,384 B2 | 10/2012 | Stager et al. | |
| 8,593,976 B2 * | 11/2013 | Kishigami et al. | 370/252 |
| 2009/0016263 A1 | 1/2009 | Kishigami et al. | |
| 2011/0012787 A1 | 1/2011 | Na et al. | |
| 2011/0026630 A1 | 2/2011 | Stager et al. | |
| 2012/0264388 A1 | 10/2012 | Guo et al. | |

(Continued)

FOREIGN PATENT DOCUMENTS

| | | |
|---|---|---|
| EP | 2129004 A1 | 12/2009 |
| EP | 2413514 A1 | 2/2012 |
| EP | 2608583 A1 | 6/2013 |

OTHER PUBLICATIONS

Nikolaidis, et al., "Cone of Silence: Adaptively Nulling Interferers in Wireless Networks," UCL Department of Computer Science, Research Note RN/10/02, Jan. 30, 2010, pp. 1-14.

(Continued)

*Primary Examiner* — Brian Roberts
(74) *Attorney, Agent, or Firm* — Edell, Shapiro & Finnan, LLC

(57) ABSTRACT

A first device having a plurality of antennas wirelessly transmits multiple series of test packets to a second device having one or more antennas, each series of test packets being transmitted with a different level of interference imposed on the test packets. The first device determines a packet error rate for each series of test packets transmitted by the first device. The first device derives an estimate of an interference cancellation capability of the second device based on the packet error rate for different levels of interference.

20 Claims, 5 Drawing Sheets

(56) References Cited

U.S. PATENT DOCUMENTS

2013/0010725 A1\* 1/2013 Wu et al. .................. 370/329
2013/0012134 A1 1/2013 Jin et al.

OTHER PUBLICATIONS

International Search Report and Written Opinion in counterpart International Application No. PCT/US2014/041872, mailed Nov. 19, 2014, 11 pages.

\* cited by examiner

US 9,226,184 B2

ESTIMATING AND UTILIZING CLIENT RECEIVE INTERFERENCE CANCELLATION CAPABILITY IN MULTI-USER TRANSMISSIONS

TECHNICAL FIELD

The present disclosure relates to wireless communication devices.

BACKGROUND

Multi-user transmissions supported, for example, by the IEEE 802.11ac tandard, offer a mechanism for improvements in throughput and airtime efficiency but require carefuls management of inter-stream interference. Even a well-designed access point (AP) will have challenges managing this interference due to the nature of a dynamic over-the-air (wireless) channel. There will always be some time between the latest sounding of clients within a multi-user (MU) group and the actual MU transmission, which will produce inter-stream interference in a steadily changing channel.

There is a tradeoff between the beamforming gain to each individual client device and the ability to suppress interference between client devices. This makes it difficult to maintain an MU link. Therefore, improving the signal-to-interference ratio in the MU downlink to each client in a MU group is important to make the MU feature useful.

DESCRIPTION OF EXAMPLE EMBODIMENTS

Overview

A first device having a plurality of antennas wirelessly transmits multiple series of test packets to a second device having one or more antennas, each series of test packets being transmitted with a different level of interference imposed on the test packets. The first device determines a packet error rate for each series of test packets transmitted by the first device. The first device derives an estimate of an interference cancellation capability of the second device based on the packet error rate for different levels of interference.

Example Embodiments

Techniques are presented herein for enabling a first device, such as a wireless local area network (WLAN) access point (AP), to determine the interference cancellation or suppression capabilities of each of a plurality of second devices, e.g., client devices. The AP can use the information about the interference cancellation (IC) capabilities of the respective clients in determining how to group the clients for purpose of multi-user (MU) multiple-input multiple-output (MIMO) transmissions.

MU inter-stream interference can be suppressed with appropriate transmit precoding at the AP, but inter-stream interference can also be suppressed at the respective client devices using IC capabilities configured or equipped on the client devices. Indeed, many client devices may be equipped with interference canceling receivers. Identifying the IC capability of a client is not only useful in improving the link to that client, it is also useful in improving the link to all other clients in the MU group.

For example, if the AP has knowledge of each client's ability to suppress interference, the AP can group clients with no IC capability with clients that have IC capability. Once these clients are grouped into MU groups, the constraint to suppress interference through transmit precoding can be relaxed to clients with IC capability or relatively strong IC capability, which leads to better beamforming gain to the non-IC capable clients (and therefore improved signal-to-interference plus noise ratio) or clients with weaker IC capability.

Figure 1:
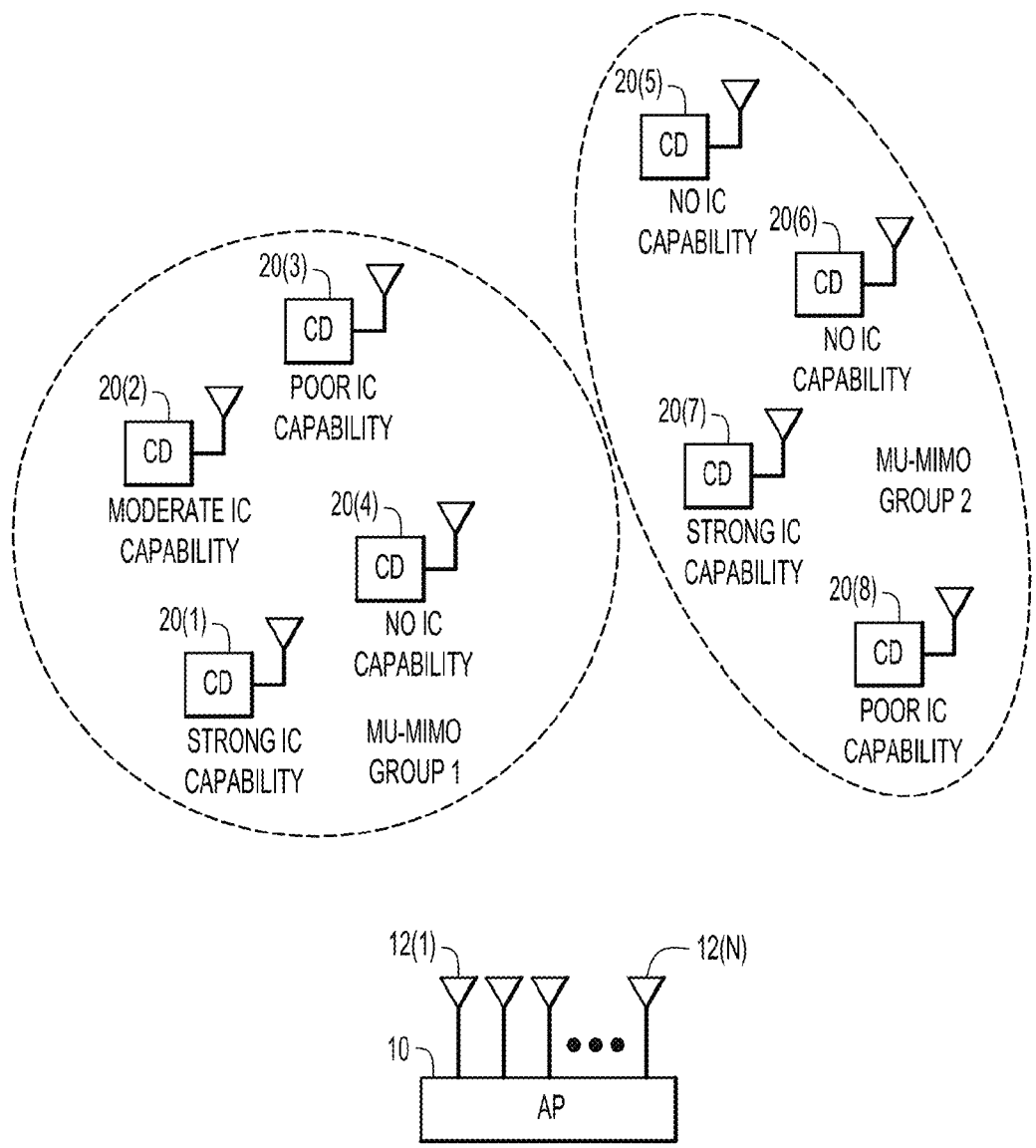
FIG. 1 is a diagram illustrating a first device configured to send multi-user transmissions to groups of second devices, and in so doing, to determine the receive interference cancellation/suppression capabilities of the clients according to the methods presented herein.

With that introduction, reference is now made to FIG. 1, which shows an access point (AP) 10 and a plurality of client devices (CDs) 20(1)-20(8). The AP 10 has a plurality of antennas 12(1)-12(N) to facilitate MU-MIMO communication to groups of clients. Using the techniques presented herein, the AP 10 is configured to determine the receive IC capability of each of the clients 20(1)-20(8) in order to determine how to group the clients for purpose of MU-MIMO transmissions. In the example shown in FIG. 1, the AP 10 has determined that CDs 20(1) and 20(7) have relatively strong IC capabilities, CDs 20(4), 20(5) and 20(6) have no IC capability, CD 20(2) has relatively moderate IC capability, and CDs 20(3) and 20(8) have relatively poor IC capabilities. Thus, for reasons explained further hereinafter, the AP 10 may group the CDs for purposes of MU-MIMO transmissions such that the CDs with relatively strong IC capabilities are in different MU-MIMO groups. For example, CD 20(1) may be assigned to a first MU-MIMO group (Group 1) and CD 20(7) assigned to a second MU-MIMO group (Group 2). CD 20(1) is grouped with other CDs that have lesser or no IC capabilities, e.g., CDs 20(2)-20(4) and CD 20(7) is grouped with other CDs that have lesser or no IC capabilities, e.g., CDs 20(5), 20(6) and 20(8).

Generally, the techniques presented herein involve imposing interference on top of test packets transmitted by the AP to a client at a given data rate. The AP modulates/adjusts that interference level over a series of test packet transmissions to determine how far the AP can go in terms of interference to a particular client. The resulting interference level reflects how well the client can cancel interference.

Figure 2:
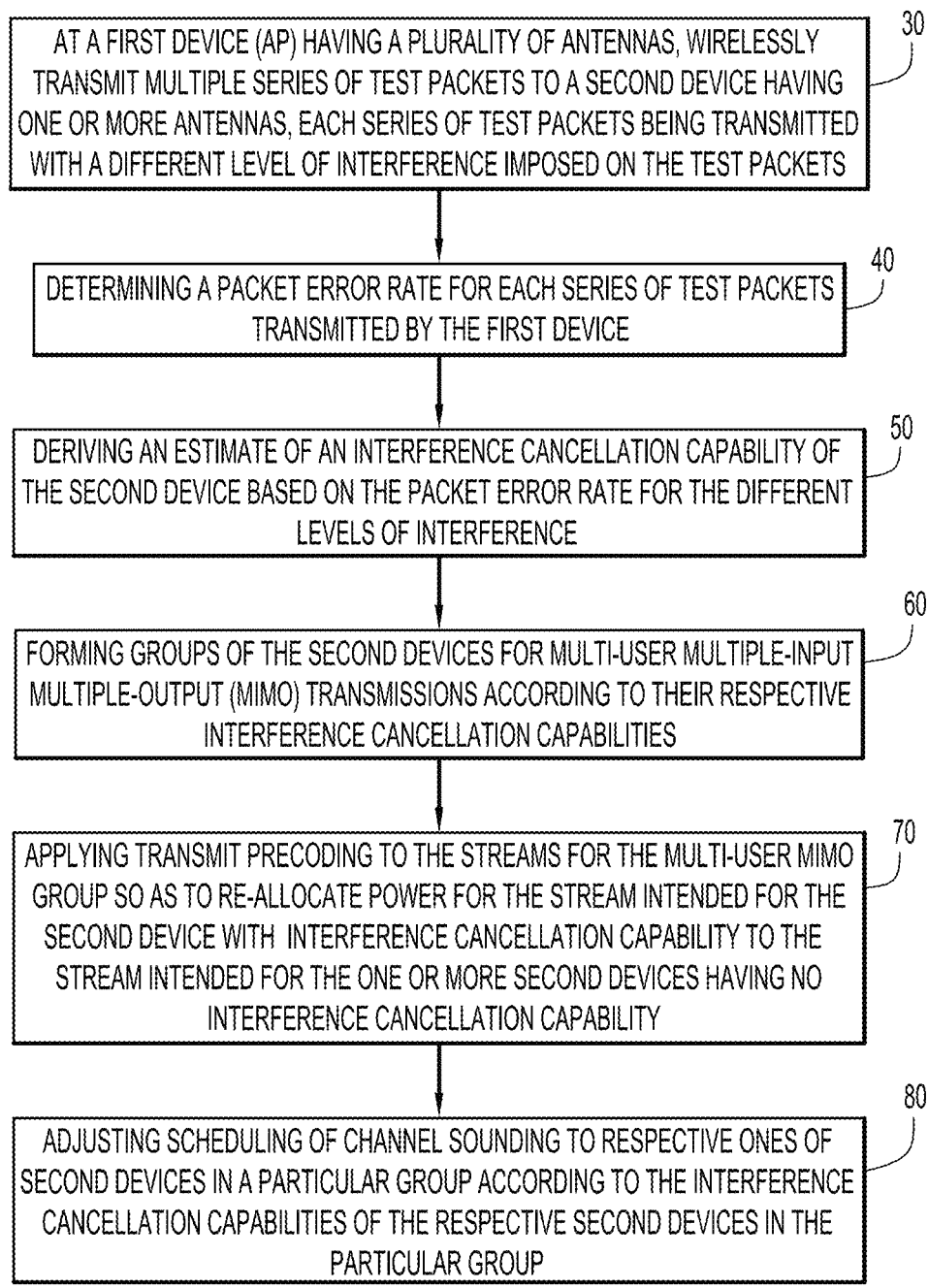
FIG. 2 is a high level flow chart depicting operations performed in the first device.

Turning now to FIG. 2, a flow chart is shown generally illustrating operations of a process performed at the AP 10 according to the techniques presented herein. At operation 30, a first device, e.g., an AP having a plurality of antennas, wirelessly transmits multiple series of test packets to a second device having one or more antennas, each series of test packets being transmitted with a different level of interference (e.g., signal-to-interference ratio, SIR) artificially imposed by the AP. At 40, the AP determines a packet error rate for each series of test packets transmitted by the AP. At 50, the AP derives an estimate of an IC capability of the client based on the packet error rate for the different levels of interference.

At 60, the AP forms groups of the clients for MU-MIMO transmissions according to their respective IC capabilities. There are many ways to determine MU grouping of clients.

For example, and as depicted in FIG. 1, clients may be assigned to a MU-MIMO group such that at least one client with (relatively stronger) IC capability is included in a group with one or more clients having no or relatively poor IC capability.

A method that groups clients based on SIR requirements allows for a spreading out of the performance across MU groups. IC capability of a client is generally inversely related to SIR requirements of the client. Generally, a client that requires a higher SIR has a lower IC capability and vice versa. The following is an example of pseudo-code for an algorithm to sort clients by their SIR requirements. Initially, clients are ordered by IC capability before this algorithm is run.

```
nGroups = floor(nClients/maxGroupSize)
for iClient = 1:nClients
    groupNumber(iClient) = mod(iClient,nGroups)
end
```

In other words, the clients are ordered according to their SIR requirements/IC capability. Clients are then distributed in the MU groups such that IC capable clients are paired with lesser or no IC capable clients.

At 70, after clients are grouped in a manner as described above for operation 60, the AP applies transmit precoding to streams for each MU-MIMO group so as to re-allocate power for a stream intended for a client with (relatively strong) IC capability to a stream intended for the one or more clients that has no or relatively poor interference cancellation capability. Specifically, by grouping clients in the manner described above, the clients with stronger IC capability can be "leaned" on to improve performance at clients with no or weaker IC capability. This may involve taking power away from a MU-MIMO stream intended for a client with relatively strong IC capability and allocating it to a MU-MIMO stream intended for one or more of the clients with no or relatively weaker IC capability. For example, the transmit power is allocated to the data/stream in an MU frame proportional to the SIR capability of the client. The power is reduced to higher IC capable clients and redistributed to the less IC capable clients. A client X is considered more IC capable than a client Y if the SIR(X) <SIR(Y), where SIR(X) is the SIR measured for client X at which the packet error rate exceeded a threshold, as described further below.

Other methods to prioritize transmit precoding for non- or low-IC capable clients include:
1. Setting signal-to-noise (SNR) values in minimum mean squared error (MMSE) precoding based on SIR requirements for each client (lower SIR requirement–>lower SNR value).
2. In block diagonalization precoding, allowing the final transmit precoding for non-IC clients to rotate a small amount out of the IC-client nullspace if it improves beamforming gain for the non- or low-IC client.

At 80, scheduling of channel sounding to respective clients in a particular MU group is adjusted according to the IC capabilities of the respective clients in the particular MU group. Sounding requirements for IC capable clients can be relaxed. Identifying those clients allows for better use of channel sounding overhead. For example, since clients with IC capability can handle more interference, the over-the-air channel to those clients may need to be sounded less frequently to maintain sufficient interference suppression by transmit precoding. Explicit sounding overhead can be allocated based on SIR requirement by allowing clients with low SIR requirements (stronger IC capability) to sound at longer intervals. The setting of these intervals can be done globally or can be set client-by-client based on estimates of SIR degradation versus time since last update.

Figure 3:
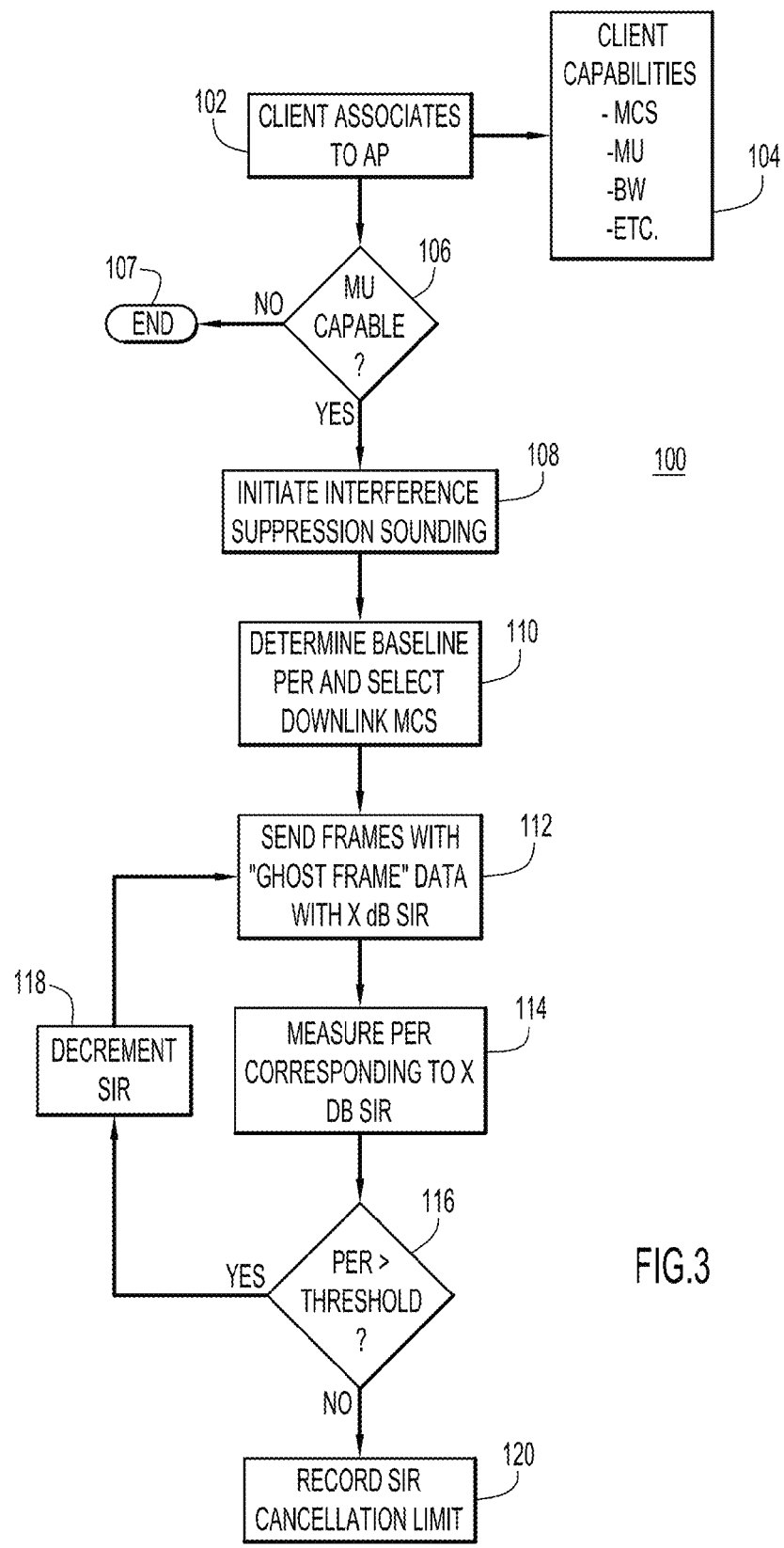
FIG. 3 is a more detailed flow chart depicting operations performed in the first device.

Reference is now made to FIG. 3 for a description of a procedure 100 to estimate the IC capability of a client. This procedure provides more details for the operations 40, 50 and 60 in the flow chart of FIG. 2. At 102, a client associates to the AP. In the course of the association process, at 104, the AP determines capabilities of the client, such as modulation coding schemes (MCS) that the client supports, whether the client is capable of receiving MU-MIMO transmissions, bandwidth capabilities of the client (can the client support wider bandwidth transmissions such as those supported by IEEE 802.11ac), etc.

At 106, based on operation 104, the AP determines whether the client is MU-capable. If it is not, then the procedure 100 ends at 107. If the client is MU-capable, then at 108, the AP performs operations to initiate interference suppression sounding. Specifically, the AP sounds the wireless channel between it and the client using implicit or explicit sounding methods, and computes beamforming vectors and nulling vectors for transmissions to be sent to the client based on channel state information obtained from the sounding. The beamforming vectors are used for beamforming a MU-MIMO stream to that client and the nulling vectors are used in operation 110.

At 110, the AP determines a baseline packet error rate (PER) for the client and the downlink MCS (i.e., modulation type/level and data rate) to use for wirelessly communicating to the client. To determine the baseline MCS and PER, the AP would transmit several beamformed single-user MIMO (SU-MIMO) packets to the client. The inherent rate adaptation algorithm of the AP would select the proper downlink MCS to use for the remainder of the process. Any residual packet error rate for the selected MCS would be recorded as the baseline PER. A common MCS is needed to attempt across multiple clients. Otherwise, one would obtain information about how resilient a particular MCS is to interference (the higher MCS will be less resilient). Since a client can move, the channel can change, etc., and it cannot be assumed that the client will always operate in the MCS used during this test.

Next, at operations 112, 114, 116, 118 and 120, a sub-process is performed to determine a value of an SIR that results in a measured PER that satisfies a predetermined relationship with respect to a threshold, e.g., PER<predetermined threshold. A client is more capable of interference suppression, i.e., has a greater IC capability, the lower the value of the SIR which still produces a PER<threshold. Specifically, at 112, the AP transmits MU "ghost" (interference) frames/packets at the same time that test packets are transmitted such that the MU ghost frames/packets serve as (i.e., cause) interference with respect to the test packets at a predetermined SIR level (X dB). The test packets are beamformed to the client using the beamforming weights computed at operation 108 and the MU ghost packets are sent using beamforming weights for a different MU stream than used for the client. The SIR level is based on relative power levels of the test packets and the ghost packets and in a first iteration, the SIR level may be set to a maximum level by using a maximum power level for the test packets and minimum power level of the ghost packets. At 114, the AP measures the PER for the series of test packets transmitted for a given level of SIR level based on reception of acknowledgments from the client sent in response to reception of the series of test packets. At 116, the AP compares the measured PER with a predetermined threshold. If the PER does not satisfy a predetermined relationship with respect to the threshold, e.g., is not less than or equal to the threshold, then at 118, the SIR is decremented/reduced by a predetermined amount. In other words, if the PER>threshold, then the SIR level is reduced. The SIR level may be reduced by reducing the power level of the test packets and/or increasing the power level of the ghost packets. After the SIR level is adjusted at 118, then operation 112 is performed again at the new SIR level to transmit another series of test packets with interfering ghost packets to solicit acknowledgments from the client device in order to determine a PER. Thus, the loop consisting of operation 112 (transmitting MU ghost packets and test packets), operation 114 (measuring PER for a given SIR level), operation 116 (comparing) and operation 118 (adjusting the SIR) is repeated until the PER satisfies a predetermined relationship with respect to the threshold, i.e., PER<threshold. When the PER satisfies the predetermined relationship with respect to the threshold, then at 120 the AP records the SIR level that results in the measured PER satisfying that predetermined relationship with respect to the threshold. In other words, the lower the level of the SIR that still satisfies PER<threshold, the greater the client interference cancellation/suppression capability of the client. The AP can then derive the interference cancellation capability of the client based on the SIR level that results in the measured PER satisfying the predetermined relationship with respect to the threshold (PER<threshold).

In a variation to incrementally adjusting the SIR, the SIR can be alternated between a particular SIR (SIR being tested) and SIR of "infinity" to control for/cancel out the impact of dynamic wireless channel conditions experienced by a client.

Figure 4:
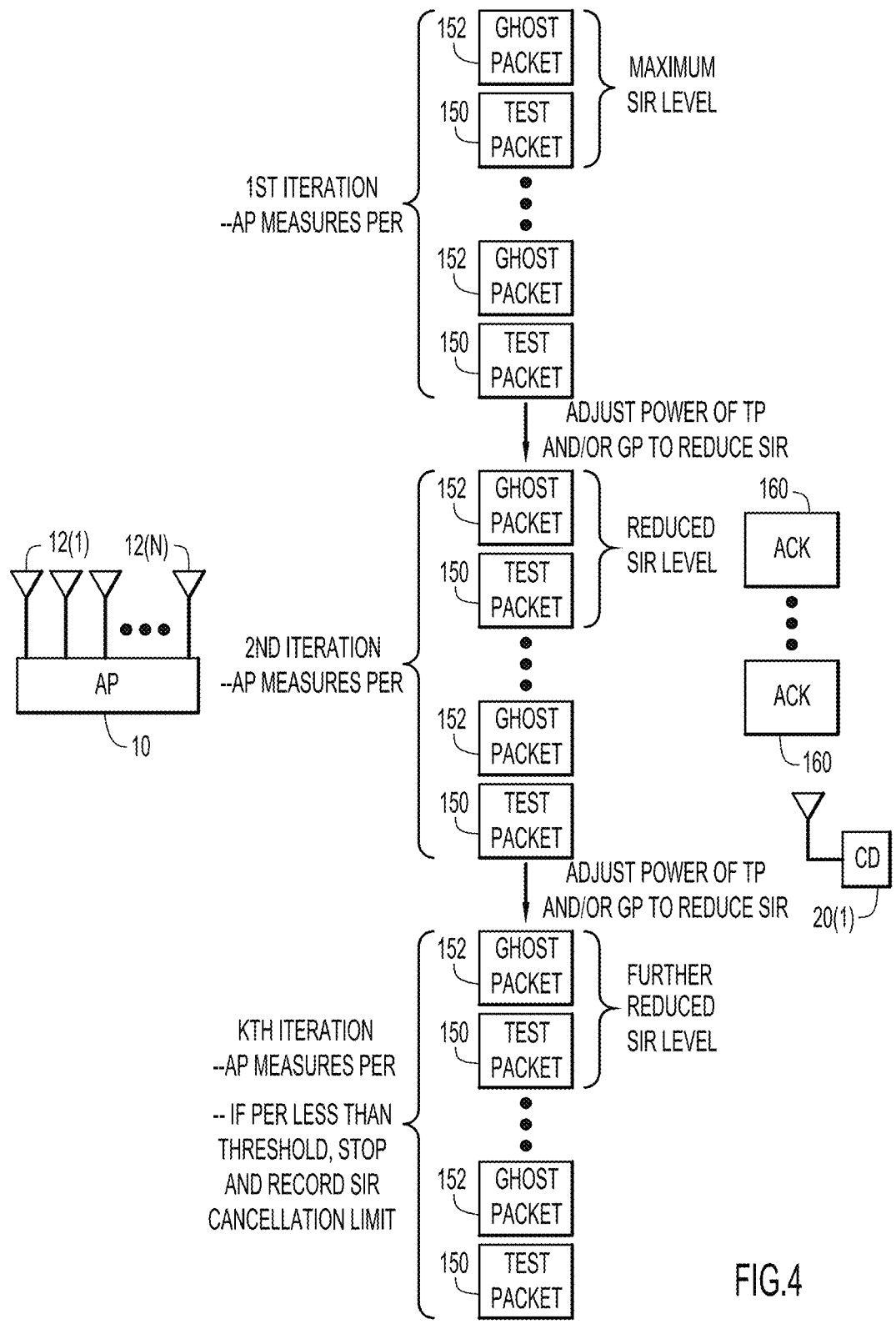
FIG. 4 is a diagram graphically depicting a process to estimate the receive interference cancellation/suppression capabilities of a client.

FIG. 4 illustrates a diagram pictorially representing the operations 112-120 of FIG. 3. FIG. 4 shows AP 10 determining the IC capability for client 20(1), as an example. In a first iteration, a series of transmissions are made of test packets (TPs) 150 and ghost packets (GPs) 152 for a first/maximum SIR level for the test packets. The client 20(1) sends acknowledgments to received test packets as shown at 160. The AP measures the PER for the first iteration. The SIR level is adjusted, i.e., reduced, and a second iteration is initiated in which a series of transmissions are made of test packets 150 and ghost packets 152 for a reduced SIR level. The AP measures PER at this reduced SIR level based on the acknowledgments it receives from the client. FIG. 4 shows that this process continues until the Kth iteration in which the SIR level has been further reduced (by an amount depending on how many iterations are needed) until the PER is less than the threshold, at which time processing stops and the AP records the SIR level as an indication of the client's IC capability. The lower the SIR level that produces a PER less than the threshold, the greater the IC capability of the client. The PER threshold used in operation 116 may be based on the baseline PER threshold and other factors.

In summary and as depicted in FIGS. 2-4, a method is provided comprising: at a first device having a plurality of antennas, wirelessly transmitting multiple series of test packets to a second device having one or more antennas, each series of test packets being transmitted with a different level of interference imposed on the test packets; determining a packet error rate for each series of test packets transmitted by the first device; and deriving an estimate of an interference cancellation capability of the second device based on the packet error rate for different levels of interference.

The foregoing describes that the techniques may be applied for a rate specific to a client. This is not meant to be limiting. It should be understood that all clients may tested at the same rate rather than a rate specific to each client. In this way, these techniques would reveal the resilience of a particular rate against interference (for all clients).

Figure 5:
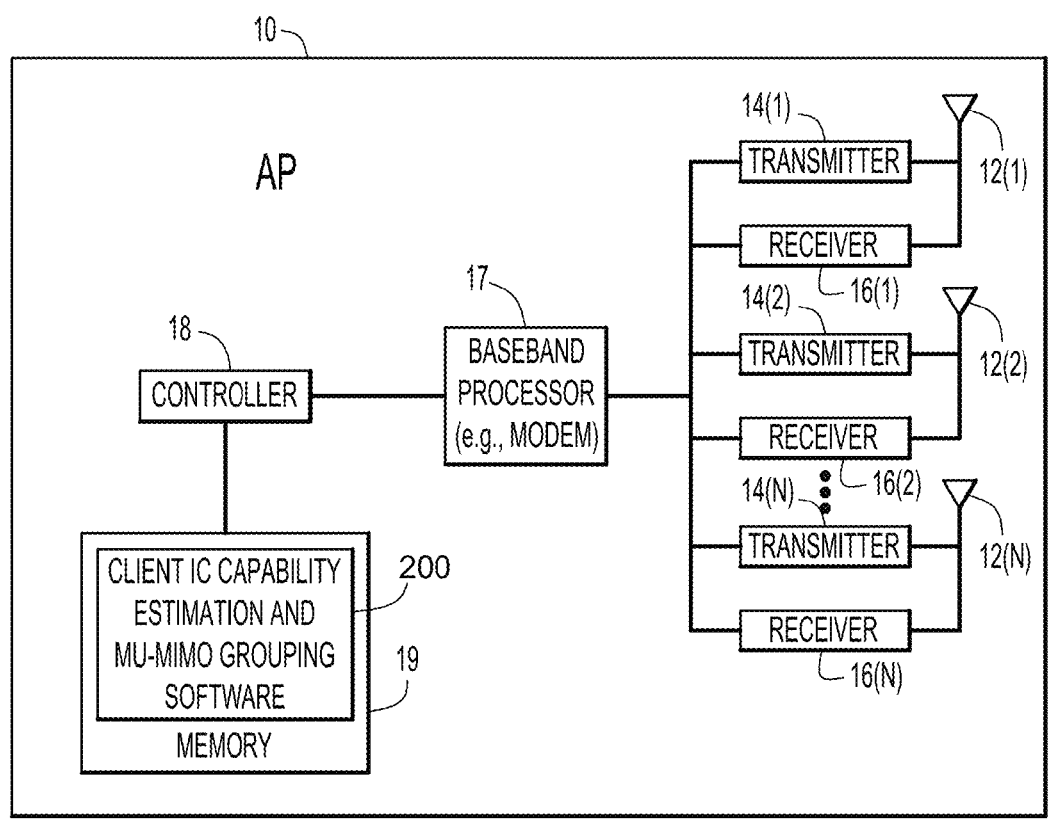
FIG. 5 is an example block diagram of a device configured to perform the methods presented herein.

Turning now to FIG. 5, an example block diagram is shown of a device, e.g., AP 10, configured to perform the techniques presented herein. The device comprises a plurality of antennas 12(1)-12(N), a plurality of transmitters 14(1)-14(N), a plurality of receivers 16(1)-16(N), a baseband processor (e.g., a modem) 17, a controller 18 and a memory 19. The controller 18 controls various functions of the AP including the modem 17 and transmitters 14(1)-14(N) to perform the sounding procedures presented herein. To this end, executable instructions for client IC capability estimation and MU-MIMO grouping software 100 are stored/encoded in the memory 19. The controller 18 is, for example, a microprocessor or microcontroller, and executes the software 200 to perform the sounding techniques and channel matrix computation techniques presented herein. Alternatively, the operations of the software 100 may be embodied in hardware in the modem 17.

The memory 19 may comprise read only memory (ROM), random access memory (RAM), magnetic disk storage media devices, optical storage media devices, flash memory devices, electrical, optical, or other physical/tangible memory storage devices. In general, the memory 19 may comprise one or more tangible (non-transitory) computer readable storage media (e.g., a memory device) encoded with software comprising computer executable instructions and when the software is executed (by the controller 18) it is operable to perform the operations described herein.

Thus, FIG. 5 depicts an apparatus configured to perform the techniques presented herein, wherein the apparatus comprises: a plurality of antennas of a first device; a plurality of transmitters, each associated with and coupled to a corresponding one of the first plurality of antennas; a plurality of receivers, each associated with and coupled to a corresponding one of the plurality of antennas; a modem configured to be coupled to the plurality of transmitters and plurality of receivers, and to supply weighted versions of packets to the plurality of transmitters for transmission to a second device and to process signals received from the second device; and a controller coupled to the modem. The controller is configured to: cause multiple series of test packets to be transmitted, each series of test packets being transmitted with a different level of interference imposed on the test packets; determine a packet error rate for each series of test packets transmitted; and derive an estimate of an interference cancellation capability of the second device based on the packet error rate for different levels of interference.

FIG. 5 also depicts an implementation of these techniques in one or more computer readable storage media encoded with software comprising computer executable instructions and when the software is executed operable to: at a first device having a plurality of antennas, cause the transmission of multiple series of test packets to a second device having one or more antennas, each series of test packets being transmitted with a different level of interference imposed on the test packets; determine a packet error rate for each series of test packets transmitted by the first device; and derive an estimate of an interference cancellation capability of the second device based on the packet error rate for different levels of interference.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
at a first device having a plurality of antennas, wirelessly transmitting multiple series of test packets to a second device having one or more antennas, each series of test packets being transmitted with a different level of interference imposed on the test packets;
determining a packet error rate for each series of test packets transmitted by the first device; and
deriving an estimate of an interference cancellation capability of the second device based on the packet error rate for different levels of interference.

2. The method of claim 1, wherein transmitting, determining and deriving are performed at the first device with respect to each of a plurality of second devices in order to determine the interference capability of each of the plurality of second devices.

3. The method of claim 2, further comprising forming groups of the second devices for multi-user multiple-input multiple-output (MIMO) transmissions according to their respective interference cancellation capabilities.

4. The method of claim 3, wherein forming groups comprises including in a group at least one second device determined to have interference cancellation capability with one or more second devices determined to have no interference cancellation capability or worse interference cancellation capability than the at least one second device determined to have interference cancellation capability.

5. The method of claim 4, further comprising applying transmit precoding to streams for the group so as to re-allocate power for a stream intended for the second device with interference cancellation capability to a stream intended for each of the one or more second devices that has no interference cancellation capability or worse interference cancellation capability than the at least one second device determined to have interference cancellation capability.

6. The method of claim 3, further comprising adjusting scheduling of channel sounding to respective ones of second devices in a group according to the interference cancellation capabilities of the respective second devices in the group.

7. The method of claim 1, further comprising determining a baseline packet error rate, modulation type/level and data rate for use by the first device in wirelessly communicating with the second device.

8. The method of claim 1, wherein wirelessly transmitting comprises transmitting multi-user interference packets at the same time as the test packets to cause interference with respect to the test packets, and further comprising:
measuring packet error rate for a given level of signal-to-interference determined by relative power levels of the test packets and the interference packets;
comparing the measured packet error rate with a threshold;
adjusting the signal-to-interference level;
repeating the transmitting of multi-user interference packets and test packets, measuring packet error rate, comparing and adjusting until the packet error rate satisfies a predetermined relationship with respect to the threshold;
recording a signal-to-interference level that results in the measured packet error rate satisfying the predetermined relationship with respect to the threshold; and
wherein deriving is based on the signal-to-interference level that results in the measured packet error rate satisfying the predetermined relationship with respect to the threshold.

9. An apparatus comprising:
a plurality of antennas of a first device;
a plurality of transmitters, each associated with and coupled to a corresponding one of the first plurality of antennas;
a plurality of receivers, each associated with and coupled to a corresponding one of the plurality of antennas;
a modem configured to be coupled to the plurality of transmitters and plurality of receivers, and to supply weighted versions of packets to the plurality of transmitters for transmission to a second device and to process signals received from the second device; and
a controller coupled to the modem, wherein the controller is configured to:
cause multiple series of test packets to be transmitted, each series of test packets being transmitted with a different level of interference imposed on the test packets;
determine a packet error rate for each series of test packets transmitted; and
derive an estimate of an interference cancellation capability of the second device based on the packet error rate for different levels of interference.

10. The apparatus of claim 9, wherein the controller is configured to perform the transmit, determine and derive operations for each of a plurality of second devices in order to determine the interference capability of each of the plurality of second devices.

11. The apparatus of claim 10, wherein the controller is configured to form groups of the second devices for multi-user multiple-input multiple-output (MIMO) transmissions according to their respective interference cancellation capabilities.

12. The apparatus of claim 11, wherein the controller is configured to form groups by including in a group at least one second device determined to have interference cancellation capability with one or more second devices determined to have no interference cancellation capability or worse interference cancellation capability than the at least one second device determined to have interference cancellation capability.

13. The apparatus of claim 12, wherein the controller is further configured to apply transmit precoding to streams for the group so as to re-allocate power for a stream intended for the second device with interference cancellation capability to a stream intended for each of the one or more second devices that has no interference cancellation capability or worse interference cancellation capability than the at least one second device determined to have interference cancellation capability.

14. The apparatus of claim 9, wherein the controller is configured to:
cause the modem to transmit multi-user interference packets at the same time as the test packets to cause interference with respect to the test packets;
measure packet error rate for a given level of signal-to-interference determined by relative power levels of the test packets and the interference packets;
compare the measured packet error rate with a threshold;
adjust the signal-to-interference level;
cause the repeat of the transmission of multi-user interference packets and test packets, measuring packet error rate, comparing and adjusting until the packet error rate satisfies a predetermined relationship with respect to the threshold;

record a signal-to-interference level that results in the measured packet error rate satisfying the predetermined relationship with respect to the threshold; and wherein the controller is operable to derive the estimate of the interference capability based on the signal-to-interference level that results in the measured packet error rate satisfying the predetermined relationship with respect to the threshold.

15. One or more non-transitory computer readable storage media encoded with software comprising computer executable instructions and when the software is executed operable to:

at a first device having a plurality of antennas, cause the transmission of multiple series of test packets to a second device having one or more antennas, each series of test packets being transmitted with a different level of interference imposed on the test packets;

determine a packet error rate for each series of test packets transmitted by the first device; and derive an estimate of an interference cancellation capability of the second device based on the packet error rate for different levels of interference.

16. The non-transitory computer readable storage media of claim 15, further comprising instructions operable to cause the transmit, determine and derive operations to be performed with respect to each of a plurality of second devices in order to determine the interference capability of each of the plurality of second devices, and instructions operable to form groups of the second devices for multi-user multiple-input multiple-output (MIMO) transmissions according to their respective interference cancellation capabilities.

17. The non-transitory computer readable storage media of claim 16, wherein the instructions operable to form groups comprise instructions operable to form groups by including in a group at least one second device determined to have interference cancellation capability with one or more second devices determined to have no interference cancellation capability or worse interference cancellation capability than the at least one second device determined to have interference cancellation capability.

18. The non-transitory computer readable storage media of claim 17, further comprising instructions operable to apply applying transmit precoding to streams for the group so as to re-allocate power for a stream intended for a second device with interference cancellation capability to a stream intended for each of the one or more second devices that has no interference cancellation capability or worse interference cancellation capability than the at least one second device determined to have interference cancellation capability.

19. The non-transitory computer readable storage media of claim 17, further comprising instructions operable to adjust scheduling of channel sounding to respective ones of second devices in the group according to the interference cancellation capabilities of the respective second devices in the group.

20. The non-transitory computer readable storage media of claim 15, further comprising instructions operable to:

transmit multi-user interference packets at the same time as the test packets to cause interference with respect to the test packets;

measure packet error rate for a given level of signal-to-interference determined by relative power levels of the test packets and the interference packets;

compare the measured packet error rate with a threshold;

adjust the signal-to-interference level;

repeat the transmitting of multi-user interference packets and test packets, measuring packet error rate, comparing and adjusting until the packet error rate satisfies a predetermined relationship with respect to the threshold;

record a signal-to-interference level that results in the measured packet error rate satisfying the predetermined relationship with respect to the threshold; and derive the interference cancellation capability of the second device based on the signal-to-interference level that results in the measured packet error rate satisfying the predetermined relationship with respect to the threshold.

* * * * *